United States Patent [19]

Simpson et al.

[11] Patent Number: 5,223,237
[45] Date of Patent: Jun. 29, 1993

[54] PROCESS FOR REMOVING SULFUR OXIDES FROM A GAS STREAM

[75] Inventors: Dale R. Simpson, Bethlehem; Harvey G. Stenger, Coopersburg, both of Pa.

[73] Assignee: Lehigh University, Bethlehem, Pa.

[21] Appl. No.: 816,465

[22] Filed: Jan. 3, 1992

[51] Int. Cl.$^5$ .................... B01J 8/00; C01B 17/00
[52] U.S. Cl. ............................................ 423/244.11
[58] Field of Search .................... 423/244 R, 244.11

[56] References Cited

U.S. PATENT DOCUMENTS

| | | | |
|---|---|---|---|
| 2,944,627 | 7/1960 | Skarstrom | 183/4.7 |
| 3,660,967 | 5/1972 | Collins et al. | 55/73 |
| 3,808,773 | 5/1974 | Reyhing | 55/31 |
| 3,829,560 | 8/1974 | Fornoff et al. | 423/522 |
| 3,988,129 | 10/1976 | Fornoff et al. | 53/33 |
| 4,209,308 | 6/1980 | Blodgett | 55/179 |
| 4,303,228 | 12/1981 | Snarski | 266/96 |
| 4,425,143 | 1/1984 | Nishizawa et al. | 55/31 |
| 4,710,364 | 12/1987 | Berry | 423/244 |
| 4,880,443 | 11/1989 | Miller et al. | 55/26 |
| 4,931,071 | 6/1990 | Kaplan et al. | 55/25 |
| 4,935,217 | 6/1990 | Simpson | 423/328 |
| 4,940,569 | 7/1990 | Neal et al. | 423/239 |
| 4,950,311 | 8/1990 | White, Jr. | 55/25 |
| 4,961,917 | 10/1990 | Byrne | 423/239 |

FOREIGN PATENT DOCUMENTS 49-05880  4/1972  Japan .
48-22355  3/1973  Japan .

OTHER PUBLICATIONS

Blodgett, G. A., $SO_2$ Adsorption on Ion-Exchanged Mordenites, Unpub M.S. Thesis, Worchester Polytechnic Ins., 1972.

Extended Abstracts, American Institute of Chemical Engineers, 1991 Annual Meeting & Third Topical Conference on Emerging Technologies in Materials submitted for review Jan. 3, 1991 — FIGS. 1 thru 15, AICHE Meeting in Los Angeles, Calif. on Nov. 17-22, 1991.

Stenger, H. G., Jr. and Simpson, R., Competitive Adsorption of Sulfur Dioxide, Water and Nitric Oxide on Mordenite, Extended Abstracts, American Institute of Chemical Engineers, 1991 Annual Meeting and Third Topical Conference on Emerging Technologies in Materials, Nov. 17-22, 1991, Westin Bonaventure, Los Angeles, Calif.

Tamboli, J. K. and Sand, L. B., $SO_2$ Sorption Properties of Molecular Sieve Zeolites, *Proc. Second Int. Clean Air Cong.*, Washington, D.C., 1970.

Hawkins, D. B., A Potential Economic Mordenite Deposit, Talkectna Mountains, Ala., In *Occurrence Properties, and Utilization of Natural Zeolite*, ed. Kallo, D. and Sherry H. S., Stillman Publishers, 1988.

Ma, Y. H. Byron, Robert J., Feltri, Paul and Lee, Ting Yueh, Effects of Presorbed Water Vapor Upon the Sorption and Diffusion of Sulfur Dioxide in Natural Mordenites, The American Institute of Chemical Engineers, 1978.

Primary Examiner—Gregory A. Heller
Attorney, Agent, or Firm—Ratner & Prestia

[57] ABSTRACT

A process for removing the sulfur oxides from a gas stream by sorbing the sulfur oxide gases in a zeolite and subsequently purging the previously-sorbed sulfur oxide gases by exposing the zeolite to water or water vapor, which is preferentially sorbed on the zeolite. The zeolite is then regenerated by desorbing the water or water vapor from the zeolite. A gas stream having a reduced volume and an increased sulfur oxide gas concentration is isolated and directed to sulfur oxide removal and processing apparatuses.

20 Claims, 3 Drawing Sheets

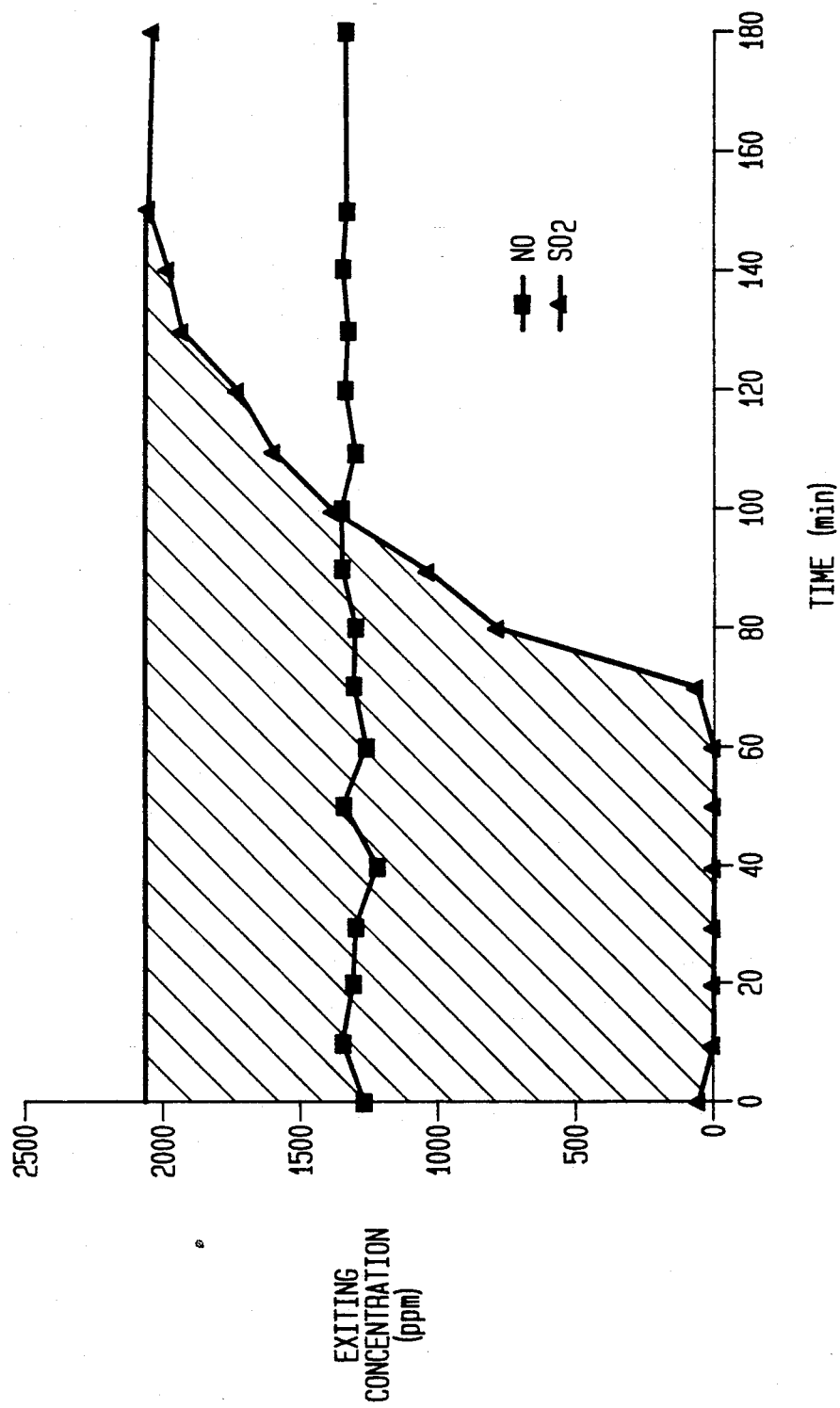

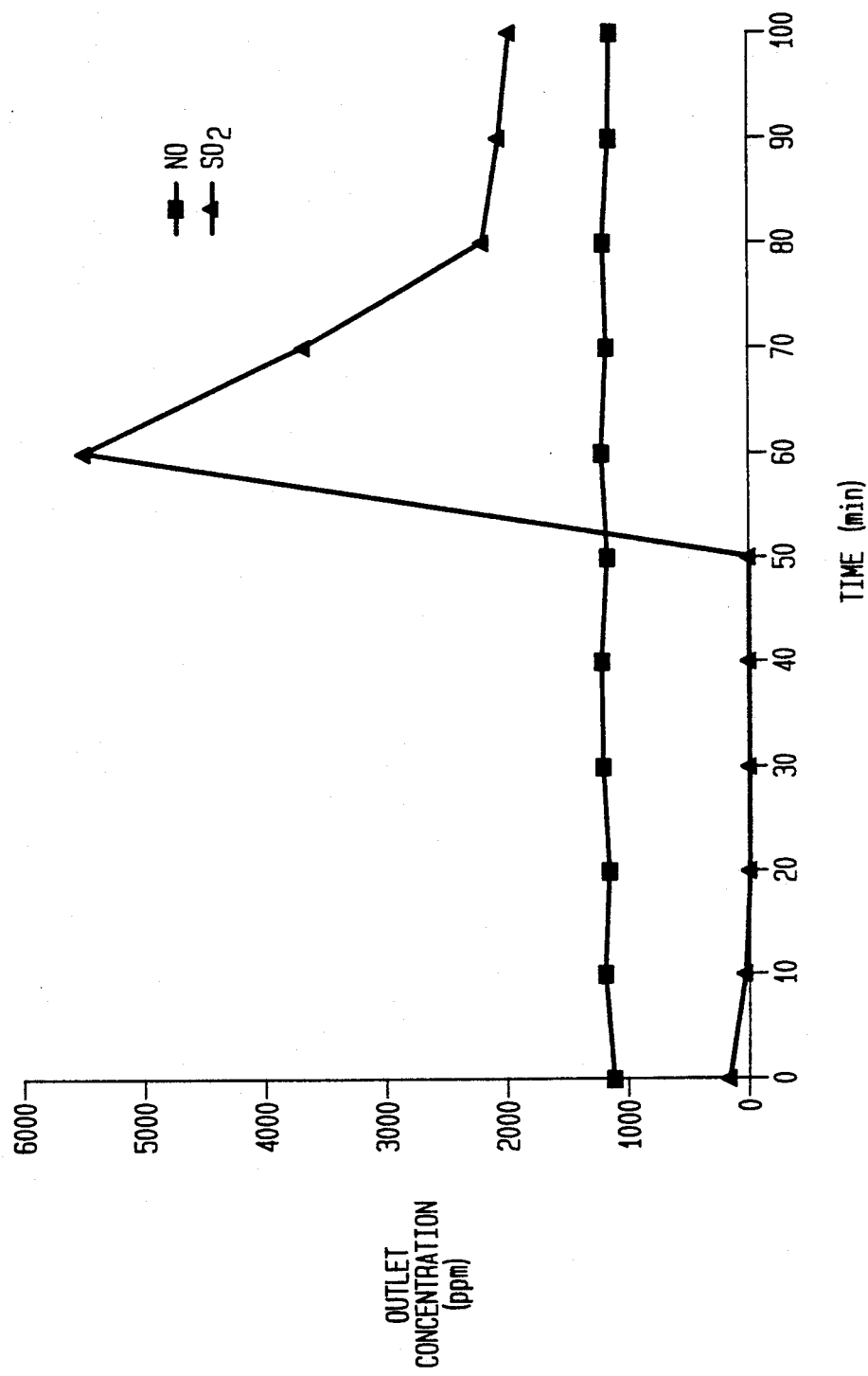

PROCESS FOR REMOVING SULFUR OXIDES FROM A GAS STREAM

FIELD OF THE INVENTION

This invention pertains to the use of zeolite to remove sulfur oxide gases from a gas stream and thereby to produce a more concentrated sulfur oxide gas stream. More particularly, it pertains to a process which may be useful to desulfurize flue gases.

BACKGROUND OF THE INVENTION

Frequently, sulfur oxide gases, such as sulfur dioxide ($SO_2$) and sulfur trioxide ($SO_3$), must be removed from a gas stream. The costs associated with a sulfur oxide removal apparatus, such as a water scrubber or bubbler, increase as the amount of gas treated increases. At low sulfur oxide levels, removal of the sulfur oxide gases is difficult.

Increasing the sulfur oxide gas concentration (or producing a more concentrated sulfur oxide gas stream) prior to sulfur oxide gas removal should reduce these costs and difficulties. Furthermore, sufficiently increasing the sulfur oxide gas concentration may permit more efficient processing of sulfur oxide gases to form marketable byproducts such as sulfuric acid, gypsum, or sulfur.

One method for removing sulfur oxide gases from a gas stream involves the sorption of sulfur oxide gases on a zeolite, which is a molecular sieve. Sorption is a process which may involve both absorption and adsorption. The zeolite should have a high sorptive capacity for sulfur oxide gases and should be stable in an acid environment because of the hydration of some sulfur trioxide to sulfuric acid. A zeolite with a high silica content is resistant to acid degradation. Mordenite, (ideally $NaAlSi_5O_{12}.3H_2O$), is one of a variety of zeolites which has been recognized as having desirable properties for the sorption of sulfur oxide gases. Mordenite has several varieties, including sodium mordenite.

Tamboli and Sand (1970) and Blodgett (1972) established adsorption isotherms for different zeolites. They found that sodium mordenite sorbed about 20 weight percent sulfur dioxide at 25° C. and at a sulfur dioxide pressure of 2 mm Hg (2600 ppm). Mordenite was found to be acid resistant and therefore recyclable. Synthetic zeolite 4Å was found to have a higher sulfur oxide capacity than other zeolites, but it was attacked by acid.

Hawkins (1988) reported that the gas-sorption data for mordenite from Alaska follows a Freundlich adsorption isotherm The constants given indicate that at 25° C. the Alaskan mordenite would sorb about 1.7 weight percent sulfur dioxide at a sulfur dioxide pressure of 2 mm of Hg. and about 9.5 weight percent sulfur dioxide at a sulfur dioxide pressure of 700 mm of Hg.

In these systems, the sorbent is heated to desorb the sulfur oxide gases. This requires enough energy to heat the sorbent (e.g. mordenite) to the temperature at which the previously-sorbed sulfur oxide gases are volatilized. Because it is difficult to instantaneously heat the zeolite bed sufficiently to cause rapid and complete desorption of the sulfur oxide gases, obtaining a gas stream with a high sulfur oxide gas concentration is difficult. Moreover, extended heating of the bed with sorbed sulfur oxides is thought to reduce bed life.

SUMMARY OF THE INVENTION

The present invention is a process for removing sulfur oxide gases from a gas stream by first contacting the gas stream with a zeolite, permitting the sulfur oxide gases to be sorbed in the zeolite; purging the sulfur oxide gases from the zeolite by contacting the zeolite with water or water vapor, which is preferentially sorbed in the zeolite. The sorbed water is then driven off the zeolite to regenerate it for the next sulfur oxide sorption cycle. The water may be driven off by heat or by contacting the zeolite with a dry gas such as dry air or aspirating the zeolite (i.e. putting a vacuum on the bed). Any combination of these three regeneration methods may also be used.

Preferably, the zeolite includes sodium. It has been found that the capacity of the zeolite to sorb sulfur oxides increases with increasing sodium content in the zeolite. A zeolite with a high silica content is also preferred to deter acid degradation. In particular, the zeolite used may be mordenite, chabazite, clinoptilolite or synthetic zeolite X.

The step of sorbing the zeolite continues until the zeolite is substantially saturated with sulfur oxide gases. The saturation point can be experimentally determined from the sorptive capacity of the zeolite used, the flow rate of the gas stream and the sulfur oxide gas concentration of the gas stream entering the zeolite. The sorbing and purging steps or the entire process may be carried out under isothermal conditions, if the bed is regenerated isothermally.

The process also includes isolating a concentrated sulfur oxide stream from the feed gas stream. This gas stream, (the "outlet gas stream" from the zeolite during desorption) has a reduced volume and an increased sulfur oxide concentration relative to the inlet gas stream to the zeolite. The high concentration sulfur oxide stream may be directed to, as the purging occurs, an apparatus which further concentrates the sulfur oxides. Isolating the purged gas stream includes controlling the flow of the purged sulfur oxide gases by using a valve sequence.

Typically, the process of this invention would be practiced in a cyclic fashion by repeatedly performing the primary process steps of sorbing sulfur oxides on a zeolite, desorbing sulfur oxides, and regenerating the zeolite sorbent. In accordance with the present invention, of course, the sulfur oxide desorbing step is accomplished by contacting the zeolite with water, or water vapor. Preferably, the sorption is done at relatively low bed temperature, on the order of 25° C.

Preferably also this cyclic process is practiced alternatively in at least two zeolite beds, one of which is desorbed and regenerated while another is sorbing.

BRIEF DESCRIPTION OF THE DRAWINGS

FIG. 2 is a graph depicting the outlet concentrations, from a zeolite bed, of nitric oxide and sulfur dioxide versus time wherein the gas entering the zeolite bed contains no water.

FIG. 3 is a graph depicting the outlet concentrations, from a zeolite bed, of nitric oxide and sulfur dioxide versus time wherein the gas entering the zeolite bed contains water.

DETAILED DESCRIPTION OF THE INVENTION

Figure 1:
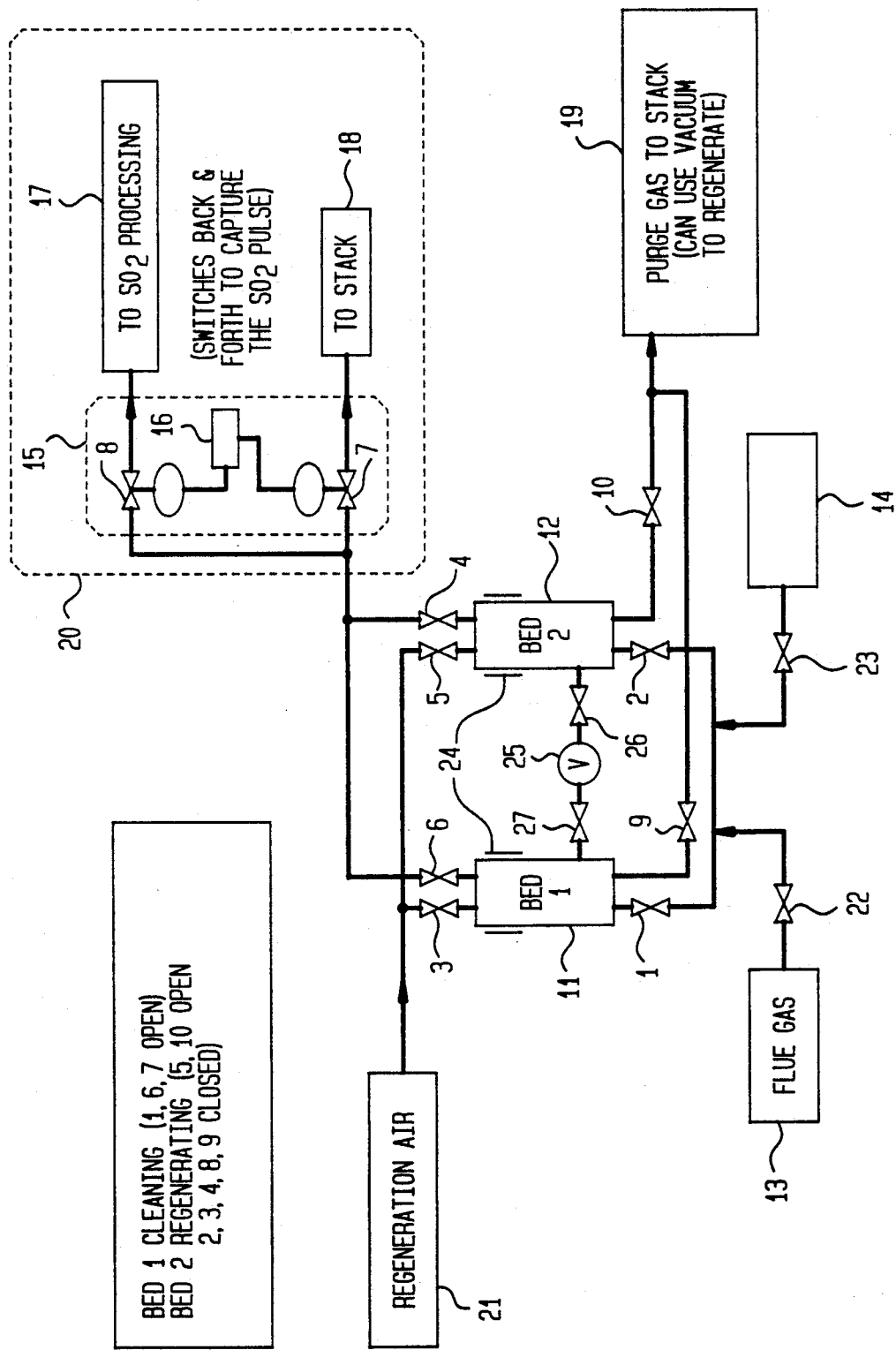
FIG. 1 is a schematic diagram of one embodiment of the invention.

Definition of Terms and Discussion of Properties

Zeolites are crystalline, hydrated, alkali metals and-/or alkaline earth metal aluminosilicates with a network of crystal structures. The network structure consists of a linkage of silica, alumina and oxygen tetrahedra, in which an oxygen ion is located at the four points of each tetrahedra and each oxygen ion is shared by two adjoining (through their common oxygen ion) tetrahedra. Each oxygen ion preferably accepts two electrons, one from each of the two tetrahedral groups with which the oxygen ion is associated.

Within each tetrahedron is a silica, alumina or alkaline earth ion, or some combination thereof. In zeolite, silica preferably donates four electrons and alumina three. Therefore, only one silica ion need be associated with a tetrahedral group in order to donate one electron to each of the four oxygen ions associated with that tetrahedron. If alumina is associated with a tetrahedron, an alkali metal with a $+1$ valence, such as sodium, is likely to also be associated with that tetrahedron.

Zeolites are molecular sieves because of their porous structures. This porous structure results from the linkage of tetrahedral groups to form eight, ten or twelve membered rings defining interior cavities within each ring. Each ring has openings, or "ports", which lead to the interior cavities. Eight, ten or twelve membered rings are conveniently designated as small, intermediate or large port molecular sieve zeolites with port diameters of approximately 4Å, 7Å and 10Å, respectively. These ports in the crystals, in some cases leading to larger interior cavities, limit passage into the interior of the crystal to particles of dimensions smaller than these ports, so that smaller particles may enter and be trapped in the crystals while large particles are rejected. Thus the term, "molecular sieve".

The molecular properties of the zeolites are a function of the size and shape of the ports and cavities within the crystal and of the sorptive characteristics of the crystalline surface within these cavities. As indicated above, the size (and shape) of the ports is a factor in determining which ions will gain access to the cavities, where exchangeable cations and water (exchangeable via hydration/dehydration) are located. Zeolites have a sorptive capacity for both sulfur oxide gases and for water (or water vapor); however, the sorptive capacity for water or water vapor is higher than that for sulfur oxide gases. It is this characteristic which is important in the present invention since it facilities rapid sulfur oxide desorption and the resultant isolation and capture of a high concentration over a short period of time (as compared to prior art thermal desorption processes).

Thus, the capacity of zeolites to sorb sulfur oxide gases depends on the chemical affinity of the various components of the zeolite. Sodium-containing zeolites seem to exhibit a strong chemical affinity for sulfur oxide gases. Most zeolites have high thermal stability, and zeolites with a high silica content have good chemical stability, even in an acid environment.

Mordenite, a molecular sieve, is a zeolite with a high silica content. The ideal composition for mordenite is $Na_2O.Al_2O_3.10SiO_2.6H_2O$, but chemical variants of this are possible by ion exchange, synthesis, or leaching. The mordenite structure, also a framework of alumina and silica tetrahedra with shared oxygen atoms at the tetrahedral points, has port dimensions (as a ten membered ring) of $6.7 \times 7.0$ Å. These ports and resulting large interior surface area make mordenite useful as a host for sorption, ion exchange, and catalytic materials.

Commercial and patented methods of synthesis of mordenite include crystallization from gels or reaction of clays, silica, or volcanic glass with solutions or mineralizers. Because different feedstocks are used for the synthesis, some chemical variance of mordenite exists. The limits of this variance have not been established.

This invention involves sorbing of sulfur oxide gases on a zeolite and then purging by water or water vapor such as steam. It is not essential that the zeolite which has the maximum sorptive capacity for sulfur oxide be used because all zeolites preferably sorb water over sulfur oxide gases. However, a sodium-bearing zeolite has the best sorptive capacity for sulfur oxide gases.

Three properties of mordenite make it especially useful in the present invention. Because it contains sodium and has a high silica to alumina ratio, the compound has: 1) superior acid resistance, 2) structural stability with heating to about 800° C., and 3) large ports which accommodate large molecules such as sulfur dioxide and sulfur trioxide. Other zeolites also found to be reasonably effective are: clinoptilolite, ideally $(NaK)Al_2Si_{10}O_{24}.12H_2O$; chabazite, ideally $(Na_2Ca)_3Al_6Si_{12}O_{36}.20H_2O$; and synthetic zeolite X, ideally $Na_2Al_2Si_{4.7}O_{13.4}.XH_2O$.

As used herein "sulfur oxide gases" is meant to include both sulfur dioxide ($SO_2$) and sulfur trioxide ($SO_3$). (Both sulfur dioxide and sulfur trioxide occur in many gas streams, but are particularly troublesome in combustion flue gases.)

"Sorption" refers to both absorption, the taking up of a matter in bulk, and adsorption, the surface retention of solid, liquid or gas molecules;

"purging" refers to the action by water molecules of displacing previously-sorbed sulfur oxide molecules from a zeolite bed;

"regenerating" refers to the removal of previously-sorbed water molecules from a zeolite bed.

Industrial Utility

By removing sulfur oxide gases from a gas stream, the present invention permits a reduced volume of a more highly concentrated sulfur oxide containing gas to be directed to a sulfur oxide gas removal process. This may be particularly useful for flue gas desulfulization. Furthermore, heat energy may not be required if the regeneration step does not include heating, more particularly if a hot dry gas is available, such as heated combustion air in a power plant, a small fraction of which may be used to regenerate the zeolite bed used in the process of this invention.

Composition and Method Details

FIG. 1 is a schematic diagram of a system in which the present invention may be used to desulfurize flue gas. It consists of a flue gas source 13 and a (liquid vapor) water source 14 connected, by way of valves 22, 23, 1 and 2, to sorbent beds 11 and 12. Flue gas typically contains sulfur oxide gases, such as sulfur dioxide and sulfur trioxide. Sorbent beds 11 and 12 contain a zeolite, preferably a zeolite which is resistant to acid degradation and has good sorptive capacity for sulfur oxides.

A sulfur oxide gas collecting device 20 is attached to the outlet side of beds 11 and 12 by way of valves 6 and 4, respectively. Sulfur oxide gas collecting device 20 consists of a valve sequence 15, which is composed of valves 7 and 8 and a switch 16. Switch 16 controls the position of valves 7 and 8. Valve 7 leads to a stack 18 and valve 8 leads to sulfur oxide processing device 17, which could include removal apparatus, such as a water scrubber or bubbler.

Regeneration air source 21 of heated air for regenerating beds 11 and 12 is connected to zeolite bed 11 or zeolite bed 12 by way of valves 3 or 5, respectively. Regeneration air exits the zeolite bed to stack 19 through valves 9 and 10, respectively.

In accordance with the present invention, the flue gas from flue gas source 13 is contacted with a zeolite bed 11. For this operation, only valves 1, 6, 7 and 22 are initially open; the remaining valves (valves 2-5, 8-10, 23, 26 and 27) are initially closed. The flue gas from flue gas source 13 flows through open valves 22 and 1 and contacts zeolite 11. Assuming that the flue gas contains no water or water vapor, the sulfur oxide gases are initially sorbed in the zeolite due to the characteristics of the sulfur oxide gases and the zeolite. During this sorbing process, the flue gases, other than sulfur oxide gases, continue to flow through open valves 6 and 7 to stack 18.

The sorbing of sulfur oxide gases from the flue gas may continue until the zeolite is completely or substantially saturated with sulfur oxide gases. This point can be experimentally determined from the sorptive capacity of the zeolite used, the flow rate of the gas stream and the sulfur oxide gas concentration of the gas stream entering the zeolite. Upon substantial saturation, the outlet concentration of the sulfur oxide gases approaches the inlet concentration of sulfur oxide gases.

At the time when zeolite 11 becomes completely or substantially saturated with sulfur oxide gases, the operator shuts valve 22 and opens valves 23, permitting water or water vapor from water source 14 to contact saturated zeolite 11. The water or water vapor molecules purge the previously-sorbed sulfur oxide gases from zeolite 11. The mass flow rate of the water or water vapor should be sufficient so that water or water vapor immediately and completely purges the sulfur oxide gases from the entire zeolite bed 11. This preferential sorption of water in zeolite over sulfur oxide gases causes the removal of all of the sulfur oxide gases which were sorbed in the zeolite 11. Thus, the quantity of sulfur oxide gases purged is equal to the quantity of sulfur oxide gases sorbed.

In order to regenerate zeolite bed 11, valves 3 and 9 may be opened, while all other valves must be closed. This allows regeneration air from source 21 to flow across zeolite bed 11 and exit to stack 19. A regeneration gas other than heated air may be used so long as it has a sufficiently lower water content (or high dew point) to effectively remove water from the sorbent bed. This creates a driving force between the saturated zeolite bed and the dry gas, which causes the water molecules to become desorbed from the zeolite. Examples of regeneration gas include dry helium, nitrogen, or a nitrogen/oxygen combination, such as air.

Alternative methods of regenerating include heating or aspirating zeolite 11. Heating may be accomplished by an outside heating source 24 or by contact of the sorbent with a hot gas stream. When hot air is used for regeneration, the zeolite bed temperature generally must be raised to 300° C. to effect regeneration.

Aspirating involves subjecting the zeolite to a vacuum such as by connection to an evacuating means 25. Upon opening valve 27, a pressure differential is created and causes the desorption of the water from zeolite bed 11.

Any combination of these three methods of regenerating the zeolite may also be used.

In an alternative embodiment of the invention, flue gas 13 includes water vapor. Here, the initial configuration of a system in which the present invention may be used to desulfurize a gas stream is the same as that described previously: Valves 1, 6, 7 and 22 are all open, while the remaining valves are closed initially. When the water vapor containing flue gas contacts zeolite bed 11, both sulfur oxide gases and water vapor are concurrently sorbed in zeolite bed 11. This sorbing continues until zeolite bed 11 is saturated with both sulfur oxide gases and water vapor. During this sorbing process, all other gases are released to stack 18 through open valves 6 and 7.

When zeolite 11 becomes completely or substantially saturated with both water and sulfur oxide gases, continued passage of the water-containing inlet stream over the zeolite bed results in displacement of sorbed sulfur oxides by the water vapor indigenous to the inlet flue gas. This continued passage serves to purge the sorbed sulfur oxide gases once saturation of zeolite 11 with both sulfur oxide gases and water vapor is reached. Water vapor displaces sulfur oxides in zeolite bed 11 because water is preferentially sorbed (as compared to sulfur oxides) by zeolite. This purging continues until zeolite bed 11 becomes saturated with water vapor. During this purging process, the gas exiting the zeolite has an increased outlet concentration of sulfur oxide gases because of the displacement of the previously sorbed sulfur oxides by water vapor. In this embodiment of the invention, the outlet sulfur oxide gas concentration from zeolite bed 11 may reach as high as three times the inlet sulfur oxide gas concentration.

In a preferred embodiment of the present invention, the zeolite contains sodium. The sodium-containing zeolite may be, for example, mordenite, chabazite, clinoptilolite, or synthetic zeolite X. Of these zeolites, mordenite has the best sulfur oxide sorptive capacity and is acid-resistant.

Mordenite can be synthesized from the reaction of sodium silicate with perlite, a volcanic glass, following the methods described in U.S. Pat. No. 4,935,217. Sodium phosphate or sodium carbonate may be substituted for sodium silicate in this process but the latter is preferred. Mordenite synthesized from either sodium phosphate or sodium carbonate has significantly less sulfur oxide sorbent capacity.

In general, the process will preferably involve sulfur oxide sorption at a relatively low temperature on the order of 25° C. and zeolite regeneration at a relatively high temperature on the order of 300° C. For example, the sulfur oxide gas sorbtive capacity for mordenite at 300° C. is about 1 weight percent, as opposed to about 10 weight percent at 25° C. In some cases, more efficient operation of the process may involve more nearly isothermal operation of the process, which may be accomplished by one of the alternative zeolite regeneration schemes in which increasing the temperature of the zeolite is minimized or avoided.

In a preferred embodiment of the present invention, a sulfur oxide gas collecting or isolating device 20 operates to isolate and collect the gas stream having an increased sulfur oxide gas concentration. As previously mentioned, while sulfur oxide gases are being sorbed in zeolite 11, valve 7 is open, releasing the remaining gases to stack 18. However, when the purging step occurs, valve combination 15 is activated. Valve combination 15 consists of valve 7 leading to stack 18, valve 8 leading to sulfur oxide gas removal and processing device 17, and switch 16 which controls the position of valves 7 and 8. Switch 16 causes valve 7 to close and valve 8 to open during the purging step so that an outlet gas rich in sulfur oxides can be captured and directed to sulfur oxide removal and processing device 17. In this manner, switch 16 switches back and forth to capture the high sulfur oxide content gas pulse, thereby sending a reduced volume of gas with an increased sulfur oxide gas concentration to sulfur oxide removal and processing device 17.

In a preferred embodiment, after zeolite bed 11 is regenerated (as previously described) it is pretreated, such as with flowing helium at a temperature of 200° C. for one hour. This removes impurities or lingering water or sulfur oxide gas molecules from the zeolite. In this way, the maximum number of sorptive sites are available for the next sorbing step.

An alternative embodiment of the present invention is a method for quasi-continuous removal of sulfur oxide gases from flue gas source 13. To do this, zeolite bed 12 is also used. Initially, valves 1, 6, 7 and 22 are open so that zeolite bed 11 is sorbing sulfur oxide gases from flue gas 13. Meanwhile, valves 5 and 10 are also open to permit regeneration air from regeneration air source 21 to flow through zeolite bed 12 to stack 19. This permits the regeneration of zeolite bed 12 so that the water molecules will be desorbed from zeolite bed 12. The remaining valves (valves 2, 3, 4, 8, 9, 23, 26 and 27) are all closed in this initial stage.

When zeolite bed 11 becomes completely or substantially saturated with either sulfur oxide gases alone or sulfur oxide gases and water vapor (depending on the water content of flue gas 13), the sulfur oxide gas collecting device 20 serves to isolate and direct the purged sulfur oxide gases to sulfur oxide gas removal and processing device 17, as discussed above.

When zeolite bed 11 becomes saturated solely with water vapor, the valve configuration of the entire operation changes. Simultaneously, valves 1, 6, 5 and 10 close while valves 3, 9, 2 and 4 open. This reverses the roles of zeolite beds 11 and 12. Also, at the same time, switch 16 operates to open valve 7 and close valve 8. This is done to direct the non-sulfur oxide gases of flue gas source 13 to stack 18. In this configuration, zeolite bed 12 is sorbing sulfur oxide gases from flue gas 13 and zeolite bed 11 is being regenerated. Alternatively, valves 3 and 9 can also be shut and zeolite bed 11 may be regenerated by another means during this time, such as by heating or aspirating.

EXAMPLES

The following examples are included to more clearly demonstrate the overall nature of the invention. These examples are comparative, not representative, of the invention.

EXAMPLE 1

For the first two experiments, approximately 2 grams of mordenite M202A was held by a porous frit in a glass tube. This mordenite was synthesized by reaction of sodium silicate with perlite, a volcanic glass, following the methods described in U.S. Pat. No. 4,935,217. After securing the tube to the apparatus, a gas stream containing 2000 ppm of sulfur dioxide and 1000 ppm of nitric oxide in helium was bubbled through a water bubbler, which may be a glass cylinder filled with distilled water. The flow of this gas was typically 100 $cm^3$/min as measured by mass flow meters and a soap-film-bubble-meter.

The gas exiting the water was directed to a by-pass line which vents to a fume hood. Samples were taken of this gas stream and analyzed using a Fourier Transform InfraRed Spectroscopy (FTIRS) until the sulfur dioxide concentration reached a constant value. This normally took about 30 minutes and was the time required to saturate the water solution with sulfur dioxide. At this time the gas was directed through the mordenite bed, which had been preheated to the desired adsorption temperature. Prior to the beginning of the experiment, the bed was dried under flowing helium for one hour at 200° C.

Time zero is when the gas begins contacting the mordenite. Immediately following time zero, samples of the gas exiting the bed were taken and analyzed with the FTIRS for sulfur dioxide and nitric oxide. Each sample and analysis took between 5 and 10 minutes to complete, at which time another sample was immediately taken. This is repeated until the concentration of both the sulfur dioxide and nitric oxide have reached their inlet values (breakthrough) and stayed constant for at least three consecutive samples.

Following breakthrough, the inlet gas was again sent to bypass and analyzed for sulfur dioxide and nitric oxide to ensure the feed composition had not changed during the run. A control experiment was also conducted following the exact same procedure except no zeolite was placed on the porous frit. In this control experiment, the breakthrough of nitric oxide and sulfur dioxide was immediate (i.e. first outlet sample was identical to the inlet).

Several runs were first conducted in which the inlet gas to the mordenite contained sulfur dioxide and nitric oxide but no water. In these "dry" experiments, the breakthrough curve was relatively sharp. FIG. 2 shows the breakthrough of sulfur dioxide and nitric oxide from a run using "dry" gas and mordenite M202A at a temperature of 100° C.

The capacity of the mordenite is calculated by knowing how much sulfur dioxide and nitric oxide are held up in the bed. This is done by multiplying the area cross hatched in FIG. 2 by the molar flow rate of gas, the molecular weight of sulfur dioxide, and dividing by the grams of mordenite in the bed. The capacity of the sample of FIG. 2 is 0.042 grams of sulfur dioxide per gram of mordenite.

EXAMPLE 2

Experiments similar to example 1 were run with gas, saturated with water, entering the sample holder. When experiments were conducted using saturated gas (via a bubbler) the breakthrough curve is fundamentally different. FIG. 3 shows a breakthrough curve for a saturated gas adsorption run at 100° C. using a fresh sample of M202A. The notable difference between this and the dry gas run was the brief desorption period where the outlet gas concentration reached nearly 3 times that of the inlet concentration (6000 ppm versus 2000 ppm in the inlet). This phenomena was observed in every saturated gas run using mordenite conducted at temperatures of 25°, 100° and 175° C. The cause of this rapid and concentrated desorption of sulfur dioxide is believed to be caused by water, because of its large concentration relative to sulfur dioxide, purging the sulfur dioxide from the mordenite.

The significance of this phenomena is the ability to generate a concentrated stream of sulfur dioxide with a single pass of flue gas through the sorbent bed.

EXAMPLE 3

A natural zeolite, clinoptilolite, ideally $(NaK)Al_2Si_{11}O_{24}.12H_2O$, from Malheur Co., Oreg. was ground and sieved to $-45+80$ mesh. The zeolite was pretreated similarly as in Example 1. The zeolite bed was initially desorbed at 200° C. by exposure to flowing helium, and sorption was at a zeolite bed temperature of 100° C. using a feed gas of 2157 ppm $SO_2$ passed through a bubbler to saturate the gas with water vapor at 25° C. The the resultant sorption curve has a profile similar to that shown in FIG. 3. This illustrates that the exit gas is depleted in $SO_2$ for 35 minutes and enriched with $SO_2$ thereafter. The highest measured concentration of $SO_2$ in the enriched gas was more than twice the concentration of the feed gas.

EXAMPLE 4

The experiment of Example 3 was repeated with natural chabazite, ideally $(Na_2Ca)_3Al_6Si_{12}O_{36}.2OH_2O$, from Gila Co., Ariz., using a feed gas of 2340 ppm $SO_2$ passed through a bubbler. The sorption curve has a similar profile to that shown in FIG. 3. The highest measured concentration of $SO_2$ in the exit gas during the self purging is 1.95 times the inlet concentration.

EXAMPLE 5

Synthetic zeolite X, ideally $Na_2Al_2Si_{4.7}O_{13.4}.XH_2O$, in a pellet form, was tested in a manner similar to Example 2. The resultant sorption curve showed an initial depletion in $SO_2$ of the exit gas followed by an enrichment in $SO_2$ in the exit gas, similar to the sorption curves for examples 2, 3 and 4. The experiment showed this zeolite to have less sorptive capacity for $SO_2$ and, therefore, less enrichment during the self purging. However, the profile of the sorption curve is similar to the profile of FIG. 3.

In summary, the present invention utilizes the preferential sorption by zeolite (preferably a sodium-containing silica zeolite such as mordenite) of water as compared to sulfur oxides to desulfurize a gas stream, such as a flue gas, by first sorbing sulfur oxides on the zeolite and then rapidly desorbing the sulfur oxides by displacement with water. This minimizes the sulfur oxide residence time on the zeolite and also minimizes the elapsed time to capture the desorbed concentrated sulfur oxide off gas stream and provides a high sulfur oxide concentration in the off gas stream. The reduced sulfur oxide residence time and more effective and more rapid removal of sulfur oxide from the zeolite, not only facilitates more efficient capture of the sulfur oxides, but also reduces loss of bed sorptive capacity with repeated cycling and reduces the possibilities of system contamination by chemical reaction of the sulfur oxides while they are in contact with the zeolite sorbent.

While this invention has been disclosed with reference to specific embodiments, it is apparent that other embodiments and equivalent variations of this invention may be devised by those skilled in the art without departing from the true spirit and scope of this invention. The dependant claims are intended to be construed to include all such embodiments and equivalent variations.

What is claimed:

1. A process for removing the sulfur oxides from a gas stream, comprising the steps of:
    contacting said stream with a zeolite, said zeolite having a sorptive capacity for sulfur oxide gases and a sorptive capacity for water, said sorptive capacity for sorbing water being greater than said sorptive capacity for sorbing sulfur oxide gases;
    permitting said sulfur oxide gases to be sorbed in said zeolite;
    purging said sulfur oxide gases from said zeolite by exposing said zeolite to water; and
    regenerating said zeolite by desorbing said water from said zeolite.

2. A process as recited in claim 1 wherein said zeolite includes at least one sodium atom per zeolite molecule.

3. A process as recited in claim 2 wherein said zeolite is selected from the group consisting of mordenite, chabazite, clinoptilolite or synthetic zeolite X.

4. A process as recited in claim 2 wherein said zeolite is mordenite prepared from sodium silicate.

5. A process as recited in claim 1 wherein said sorbing continues until said zeolite is substantially saturated with said sulfur oxide gases.

6. A process as recited in claim 1 wherein said sorbing and said purging steps are performed under isothermal conditions.

7. A process as recited in claim 1 wherein said process is performed under isothermal conditions.

8. A process as recited in claim 1 wherein said regenerating step comprises heating said zeolite.

9. A process as recited in claim 1 wherein said regenerating step comprises exposing said zeolite to dry air.

10. A process as recited in claim 1 wherein said regenerating step comprises aspirating said zeolite.

11. A process as recited in claim 1 wherein said purging of said sulfur oxide gases results in an increased sulfur oxide concentration gas stream and said process further includes isolating said increased sulfur oxide concentration gas stream.

12. A process as recited in claim 11 wherein said isolating step comprises controlling the flow of said increased sulfur oxide gases, by directing said increased sulfur oxide concentration gas stream to a sulfur oxide gas removal process when said purging occurs.

13. A process as recited in claim 12, wherein said isolating comprises:
    using a valve leading to said sulfur oxide gas processing means;
    using a valve leading to a stack; and
    controlling the position of said valves having a switch and directing said increased $SO_2$ concentration gas stream to said sulfur oxide gas removal means when said purging occurs.

14. A process as recited in claim 1, wherein said process further includes the step of pretreating said zeolite with helium by exposing said zeolite to flowing helium having a temperature of 200° C. for one hour.

15. A process as recited in claim 11, wherein said increased $SO_2$ concentration gas stream has a sulfur oxide concentration of approximately three times that of said sulfur oxide gas-containing gas stream.

16. A process as recited in claim I wherein said sorbing occurs at a zeolite temperature of about 25° C.

17. A process as recited in claim 1 wherein said regenerating step comprises heating said zeolite to a temperature of about 300° C.

18. A process for concentrating sulfur oxide gases of an inlet gas stream having water vapor, comprising the steps of:
 contacting said stream with a zeolite, said zeolite having a sorptive capacity for sulfur oxide gases and a sorptive capacity for water, said sorptive capacity sorbing for water being greater than said sorptive capacity for sulfur oxide gases;
 permitting said sulfur oxide gases and said water vapor to be concurrently sorbed in said zeolite;
 purging said sulfur oxide gases from said zeolite by continuing to expose said zeolite to said water contained in said inlet gas stream, after said zeolite is substantially saturated with both said sulfur oxide gases and said water; and
 regenerating said zeolite by desorbing said water from said zeolite.

19. In a cyclic process for removing sulfur oxides from a gas stream by (a) contacting said gas stream with a zeolite, said zeolite having a sorptive capacity for sulfur oxide gases and a sorptive capacity for water, said sorptive capacity for water being greater than said sorptive capacity for sulfur oxide gases, (b) sorbing said sulfur oxides thereon, (c) removing said sulfur oxides therefrom, (d) regenerating said zeolite to restore its sulfur oxide sorptive capacity, and (e) repeatedly performing steps (a), (b), (c) and (d), the improvement consisting of, in step (c), contacting said zeolite with water.

20. A process for removing the sulfur oxide gases from a gas stream, comprising the steps of:
 contacting said stream with a zeolite which preferentially sorbs water as compared to sulfur oxide gases;
 permitting said sulfur oxide gases to be sorbed in said zeolite;
 purging said sulfur oxide gases from said zeolite by exposing said zeolite to water; and
 regenerating said zeolite by desorbing said water from said zeolite.

* * * * *